(12) United States Patent
Yang et al.

(10) Patent No.: US 12,143,031 B2
(45) Date of Patent: Nov. 12, 2024

(54) MULTI-LEVEL POWER CONVERTOR AND METHOD FOR MULTI-LEVEL POWER CONVERTOR

(71) Applicant: ABB E-MOBILITY B.V., Delft (NL)

(72) Inventors: Fu Yang, Shenzhen (CN); Yaming Shi, Shenzhen (CN)

(73) Assignee: ABB E-MOBILITY B.V., Delft (NL)

( * ) Notice: Subject to any disclaimer, the term of this patent is extended or adjusted under 35 U.S.C. 154(b) by 75 days.

(21) Appl. No.: 17/776,122

(22) PCT Filed: Nov. 11, 2019

(86) PCT No.: PCT/CN2019/117102
§ 371 (c)(1),
(2) Date: May 11, 2022

(87) PCT Pub. No.: WO2021/092720
PCT Pub. Date: May 20, 2021

(65) Prior Publication Data
US 2022/0399830 A1 Dec. 15, 2022

(51) Int. Cl.
*H02M 1/00* (2007.01)
*H02M 7/483* (2007.01)
(Continued)

(52) U.S. Cl.
CPC ....... *H02M 7/4833* (2021.05); *H02M 1/0043* (2021.05); *H02M 7/493* (2013.01); *H02M 7/797* (2013.01); *H02M 7/49* (2013.01)

(58) Field of Classification Search
CPC .... H02M 1/0043; H02M 1/007; H02M 7/483; H02M 7/49; H02M 7/493
See application file for complete search history.

(56) References Cited

U.S. PATENT DOCUMENTS

| 5,737,201 A | 4/1998 | Meynard et al. |
| 8,395,913 B2 | 3/2013 | Torrico-Bascop |

(Continued)

FOREIGN PATENT DOCUMENTS

| CN | 102882409 A | 1/2013 |
| CN | 103346690 A | 10/2013 |

(Continued)

OTHER PUBLICATIONS

International Search Report and Written Opinion for International Application No. PCT/CN2019/117102, dated Aug. 12, 2020, 7 pages.

(Continued)

*Primary Examiner* — Gary A Nash
(74) *Attorney, Agent, or Firm* — McCarter & English, LLP

(57) ABSTRACT

Described herein is a multi-level power convertor and a method for a multi-level power convertor. The multi-level power convertor includes a DC port; an AC port; a first power converting unit, a second power converting unit, a coupling inductor, and an inductive filtering unit. The first power converting unit is coupled to the DC port and includes a first AC terminal adapted to provide a first plurality of voltage levels. The second power converting unit is coupled to the DC port and includes a second AC terminal adapted to provide a second plurality of voltage levels, where the second plurality of voltage levels are phase-shifted by 90 degrees with respect to the first plurality of voltage levels. The coupling inductor includes first and second windings with a same number of turns. The inductive filtering unit is arranged between the AC port and ends of the first and second windings.

20 Claims, 7 Drawing Sheets

(51) Int. Cl.
*H02M 7/49* (2007.01)
*H02M 7/493* (2007.01)
*H02M 7/797* (2006.01)

(56) References Cited

U.S. PATENT DOCUMENTS

| | | | | |
|---|---|---|---|---|
| 9,787,217 | B2* | 10/2017 | Hu | H02M 7/23 |
| 10,116,229 | B1* | 10/2018 | Alshammaa | H02J 3/381 |
| 2014/0133201 | A1* | 5/2014 | Brandmeyer | H02J 9/061 |
| | | | | 363/65 |
| 2015/0085541 | A1* | 3/2015 | Hu | H02M 7/5395 |
| | | | | 363/71 |
| 2015/0170822 | A1* | 6/2015 | Ye | H01F 38/023 |
| | | | | 336/12 |
| 2015/0280608 | A1 | 10/2015 | Yoscovich et al. | |
| 2015/0349662 | A1* | 12/2015 | Jiang | H02M 7/5395 |
| | | | | 363/71 |
| 2016/0172976 | A1* | 6/2016 | Mu | H02M 7/493 |
| | | | | 323/271 |
| 2016/0329832 | A1 | 11/2016 | Aeloiza | |
| 2016/0352251 | A1 | 12/2016 | Li et al. | |
| 2016/0352278 | A1* | 12/2016 | Jiang | B66B 1/308 |
| 2018/0091062 | A1* | 3/2018 | Hsieh | H02M 5/4585 |
| 2018/0212534 | A1* | 7/2018 | Fu | H02M 7/487 |
| 2018/0309383 | A1* | 10/2018 | Wang | H02M 7/4837 |

FOREIGN PATENT DOCUMENTS

| | | |
|---|---|---|
| CN | 103368427 A | 10/2013 |
| CN | 107134937 A | 9/2017 |
| CN | 108809133 A | 11/2018 |
| KR | 20160027408 A | 3/2016 |

OTHER PUBLICATIONS

Quan Zhongyi et al: Multilevel Voltage-Source Converter Topologies with Internal Parallel Modularity, IEEE Transactions on Industry Applications, IEEE Service Center, Piscataway, NJ, US, vol. 56, No. 1, Sep. 16, 2019 (Sep. 16, 2019), pp. 378-389, XP011766823, ISSN: 0093-9994, DOI: 10.1109/TIA.2019.2941924 [retrieved on Jan. 17, 2020].

Boillat D. O. et al: "Modeling and Experimental Analysis of a Coupling Inductor Employed in a High Performance AC Power Source", Renewable Energy Research and Applications (ICRERA), 2012 International Conference On, IEEE, Nov. 11, 2012 (Nov. 11, 2012), pp. 1-18, XP032440255, DOI: 10.1109/ICRERA.2012.6477401, ISBN: 978-1-4673-2328-4.

Rene P. T. Bascope et al: "Multi-state Commutation Cells to Increase Current Capacity of Multi-level Inverters", Telecommunications Energy Conference (INTELEC), 2011 IEEE 33rd International, IEEE, Oct. 9, 2011 (Oct. 9, 2011), pp. 1-9, XP032071317, DOI: 10.1109/INTLEC.2011.6099806, ISBN: 978-1-4577-1249-4.

Hedayati Mohammad Hassan et al: "Integrated Common-mode Inductor Design for Parallel Interleaved Converters", IET Power Electronics, IET, UK, vol. 9, No. 10, Aug. 17, 2016 (Aug. 17, 2016), pp. 2130-2138, XP006058035, ISSN: 1755-4535, DOI: 10.1049/IET-PEL.2015.0837.

Extended European Search Report issued in International Patent Application No. PCT/CN2019/117102, dated Jun. 16, 2023, 9 pps.

* cited by examiner

MULTI-LEVEL POWER CONVERTOR AND METHOD FOR MULTI-LEVEL POWER CONVERTOR

CROSS-REFERENCE TO RELATED APPLICATION

This application is a National Stage Entry of International Patent Application No. PCT/CN2019/117102, filed Nov. 11, 2019 and titled "MULTI-LEVEL POWER CONVERTOR AND METHOD FOR MULTI-LEVEL POWER CONVERTOR", which is hereby incorporated by reference in its entirety.

BACKGROUND

Embodiments of present disclosure generally relate to the field of power convertors, and more particularly, to a multi-level power convertor and a method for a multi-level power convertor.

Currently, multi-level power converters are widely used in various fields, which can effectively decrease the switching frequency and improve the output waveform quality.

FIG. 1 illustrates a schematic circuit diagram of a conventional multi-level power convertor 100. As shown in FIG. 1, the multi-level power convertor 100 includes a DC port and an AC port. The DC port includes DC terminals DC+ and DC−. Capacitors C1 and C2 are connected in series between the DC terminals DC+ and DC−. Switching semiconductor devices S1, S2, S3, and S4 are connected in series between the DC terminals DC+ and DC−. The switching semiconductor devices S1, S2, S3, and S4 are line frequency switches. A node N1 between the capacitors C1 and C2 is connected to a node N2 between the switching semiconductor devices S2 and S3. A first branch including switching semiconductor devices S5, S6, S17, and S18 is connected in series between a node N3 and an inductor L. A second branch including switching semiconductor devices S7, S8, S19, and S20 are connected in series between a node N4 and the inductor L. The switching semiconductor devices S5, S6, S17, S18, S7, S8, S19, and S20 are high frequency switches. Capacitors C3, C5, and C7 are connected between the first and second branches, respectively. The switching semiconductor devices S1, S2, S3, S4, S5, S6, S17, S18, S7, S8, S19, and S20 may be switched on and off under control of respective driving signals. With the above arrangement, the multi-level power convertor 100 may output nine voltage levels at the AC port.

When the multi-level power convertor 100 operates, the capacitors C3, C5, and C7 may be connected in series via respective ones of the switching semiconductor devices S5, S6, S17, S18, S7, S8, S19, and S20. In a steady state of the multi-level power convertor 100, the voltages across the capacitors C3, C5, and C7 are stable. However, in a dynamic state of the multi-level power convertor 100, the voltages across the capacitors C3, C5, and C7 may be out of control. For example, the voltage of the capacitor C3, C5, or C7 may become relatively high. In this event, the corresponding switching semiconductor devices S5, S6, S17, S18, S7, S8, S19, or S20 may be susceptible to be damaged. Hence, the performance and reliability of the multi-level power convertor 100 would be adversely affected.

Thus, there is need for a solution for improving the performance and reliability of the multi-level power convertor.

BRIEF DESCRIPTION

In view of the foregoing problems, various example embodiments of the present disclosure provide a multi-level power convertor and a method for a multi-level power convertor so as to improve the performance and reliability of the multi-level power convertor.

In a first aspect of the present disclosure, example embodiments of the present disclosure provide a multi-level power convertor. The multi-level power convertor includes a DC port; an AC port; a first power converting unit coupled to the DC port and including a first AC terminal adapted to provide a first plurality of voltage levels; a second power converting unit coupled to the DC port and including a second AC terminal adapted to provide a second plurality of voltage levels of the same number as the first plurality of voltage levels, wherein the second plurality of voltage levels are phase-shifted by 90 degrees with respect to the first plurality of voltage levels; a coupling inductor including first and second windings with the same number of turns, wherein the first winding includes a first end coupled to the first AC terminal and a second end, the second winding includes a third end coupled to the second AC terminal and a fourth end, and the second end of the first winding and the third end of the second winding are namesake ends of the first and second windings; and an inductive filtering unit arranged between the AC port and the second and fourth ends of the first and second windings.

In some embodiments, the second and fourth ends of the first and second windings are coupled to a common node, and the inductive filtering unit includes an inductor arranged between the common node and the AC port.

In some embodiments, the inductive filtering unit includes: a first inductor arranged between the second end of the first winding and the AC port; and a second inductor arranged between the fourth end of second winding and the AC port.

In some embodiments, the inductive filtering unit includes an additional coupling inductor including third and fourth windings, the third winding is arranged between the second end of the first winding and the AC port, the fourth winding is arranged between the fourth end of second winding and the AC port, and namesake ends of the third and fourth windings are connected to the AC port.

In some embodiments, each of the first and second AC terminals provides five voltage levels, and the AC port provides nine voltage levels.

In some embodiments, the DC port includes first and second DC terminals, and the first power converting unit includes: first and second capacitors connected in series between the first and second DC terminals; first, second, third, and fourth switching semiconductor devices connected in series between the first and second DC terminals, wherein a first node between the first and second capacitors is connected to a second node between the second and third switching semiconductor devices; fifth and sixth switching semiconductor devices connected in series between a third node and the first AC terminal, the third node being between the first and second switching semiconductor devices; seventh and eighth switching semiconductor devices connected in series between a fourth node and the first AC terminal, the fourth node being between the third and fourth switching semiconductor devices; and a third capacitor connected between a fifth node and a sixth node, the fifth node being between the fifth and sixth switching semiconductor devices, and the sixth node being between the seventh and eighth switching semiconductor devices.

In some embodiments, the second power converting unit includes: the first and second capacitors shared with the first power converting unit; the first, second, third, and fourth switching semiconductor devices shared with the first power converting unit; ninth and tenth switching semiconductor devices connected in series between the third node and the second AC terminal; eleventh and twelfth switching semiconductor devices connected in series between the fourth node and the second AC terminal; and a fourth capacitor connected between a seventh node and a eighth node, the seventh node being between the ninth and tenth switching semiconductor devices, and the eighth node being between the eleventh and twelfth switching semiconductor devices.

In some embodiments, the second power converting unit includes: the first and second capacitors shared with the first power converting unit; thirteenth, fourteenth, fifteenth, and sixteenth switching semiconductor devices connected in series between the first and second DC terminals, wherein a ninth node between the fourteenth and fifteenth switching semiconductor devices is connected to the first node; ninth and tenth switching semiconductor devices connected in series between the a tenth node and the second AC terminal, the tenth node being between the thirteenth and fourteenth switching semiconductor devices; eleventh and twelfth switching semiconductor devices connected in series between an eleventh node and the second AC terminal, the eleventh node being between the fifteenth and sixteenth switching semiconductor devices; and a fourth capacitor connected between a seventh node and an eighth node, the seventh node being between the ninth and tenth switching semiconductor devices, and the eighth node being between the eleventh and twelfth switching semiconductor devices.

In some embodiments, each of the first and second AC terminals provides nine voltage levels, and the AC port provides seventeen voltage levels.

In some embodiments, the multi-level power convertor operates as an inverter when the DC port is used as an input and the AC port is used as an output, and the multi-level power convertor operates as a rectifier when the AC port is used as an input and the DC port is used as an output.

In a second aspect of the present disclosure, example embodiments of the present disclosure provide a method for a multi-level power convertor. The multi-level power convertor includes a DC port; an AC port; a first power converting unit coupled to the DC port and including a first AC terminal; a second power converting unit coupled to the DC port and including a second AC terminal; a coupling inductor including first and second windings with the same number of turns, wherein the first winding includes a first end coupled to the first AC terminal and a second end, the second winding includes a third end coupled to the second AC terminal and a fourth end, and the second end of the first winding and the third end of the second winding are namesake ends of the first and second windings; and an inductive filtering unit arranged between the AC port and the second and fourth ends of the first and second windings. The method includes providing a first plurality of voltage levels to the first end of the first winding from the first AC terminal; providing a second plurality of voltage levels of the same number as the first plurality of voltage levels to the third end of the second winding from the second AC terminal, wherein the second plurality of voltage levels are phase-shifted by 90 degrees with respect to the first plurality of voltage levels; and outputting a third plurality of voltage levels via the second end of the first winding and the fourth end of the second winding, wherein the number of the third plurality of voltage levels equals to the sum of the number of the first plurality of voltage levels and the number of the second plurality of voltage levels minus one.

In some embodiments, the second and fourth ends of the first and second windings are coupled to a common node, and wherein the inductive filtering unit includes an inductor arranged between the common node and the AC port.

In some embodiments, the inductive filtering unit includes: a first inductor arranged between the second end of the first winding and the AC port; and a second inductor arranged between the fourth end of second winding and the AC port.

In some embodiments, the inductive filtering unit includes an additional coupling inductor including third and fourth windings, the third winding is arranged between the second end of the first winding and the AC port, the fourth winding is arranged between the fourth end of second winding and the AC port, and namesake ends of the third and fourth windings are connected to the AC port.

According to various embodiments of the present disclosure, the first plurality of voltage levels and the second plurality of voltage levels may be combined by the coupling inductor into a third plurality of voltage levels; the number of the third plurality of voltage levels is larger than the number of the first plurality of voltage levels and the number of the second plurality of voltage levels, respectively. In this way, the multi-level power convertor in accordance with embodiments of the present disclosure may generate the same number of voltage levels as the conventional multi-level power convertor through using less capacitors, reducing the risk of voltage imbalance among the capacitors in the multi-level power convertor and thereby avoiding the damage of the switching semiconductor devices in the multi-level power convertor. Hence, the performance and reliability of the multi-level power convertor may be improved.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner.

Throughout the drawings, the same or similar reference symbols are used to indicate the same or similar elements.

DETAILED DESCRIPTION

Figure 1:
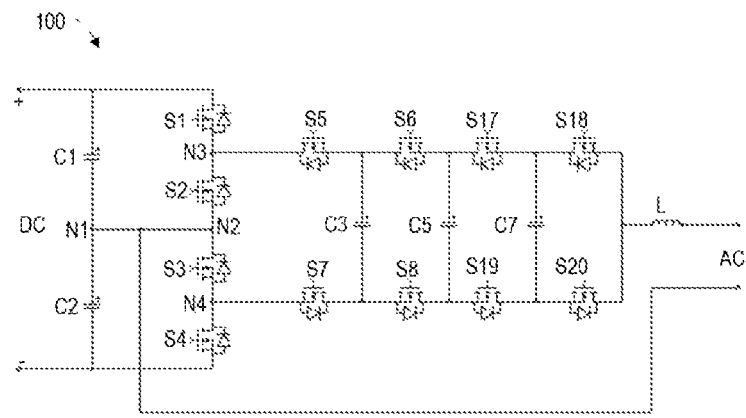
FIG. 1 illustrates a schematic circuit diagram of a conventional multi-level power converter.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As discussed above, the performance and reliability of the conventional multi-level power convertor may be adversely affected due to the use of multiple capacitors. According to embodiments of the present disclosure, to improve the performance and reliability of the multi-level power convertor, the first plurality of voltage levels and the second plurality of voltage levels having a phase shift of 90 degrees may be combined by the coupling inductor, such that the multi-level power convertor in accordance with embodiments of the present disclosure may generate the same number of voltage levels as the conventional multi-level power convertor through using less capacitors. The above idea may be implemented in various manners, as will be described in detail in the following paragraphs.

Figure 2:
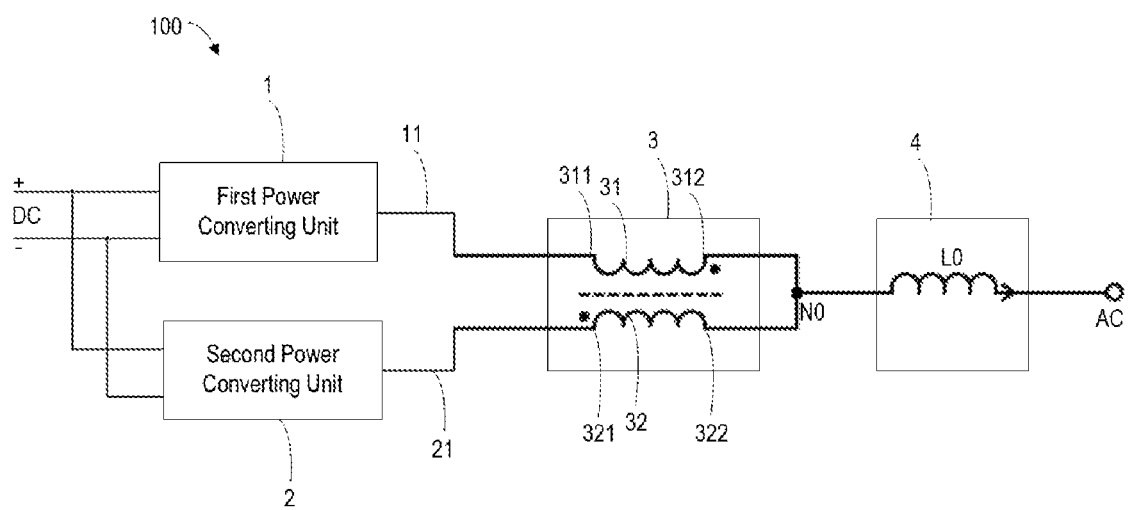
FIG. 2 illustrates a block diagram of a multi-level power convertor in accordance with an embodiment of the present disclosure.

Hereinafter, the principles of the present disclosure will be described in detail with reference to FIGS. 2-10. Referring to FIG. 2 first, FIG. 2 illustrates a block diagram of a multi-level power convertor 100 in accordance with an embodiment of the present disclosure. As shown in FIG. 2, the multi-level power convertor 100 generally includes a DC port, an AC port, a first power converting unit 1, a second power converting unit 2, a coupling inductor 3, and an inductive filtering unit 4. The multi-level power convertor 100 may be a bidirectional power convertor. The multi-level power convertor 100 may operate as an inverter when the DC port is used as an input and the AC port is used as an output. Instead, the multi-level power convertor 100 may operate as a rectifier when the AC port is used as an input and the DC port is used as an output.

The DC port includes first and second DC terminals DC+, DC−. The first power converting unit 1 and the second power converting unit 2 are coupled to the DC port, respectively. The first power converting unit 1 includes a first AC terminal 11 for providing a first plurality of voltage levels. The second power converting unit 2 includes a second AC terminal 21 for providing a second plurality of voltage levels. The number of the second plurality of voltage levels is the same as the number of the first plurality of voltage levels. The first and second power converting units 1 and 2 have the same switching cycle. In addition, the second plurality of voltage levels are phase-shifted by 90 degrees, i.e., a quarter of the switching cycle of the first and second power converting units 1 and 2, with respect to the first plurality of voltage levels.

The coupling inductor 3 includes first and second windings 31, 32 with the same number of turns. The first winding 31 includes a first end 311 coupled to the first AC terminal 11 and a second end 312. The second winding 32 includes a third end 321 coupled to the second AC terminal 21 and a fourth end 322. The second end 312 of the first winding 31 and the third end 321 of the second winding 32 are namesake ends of the first and second windings 31, 32. With such an arrangement, the first and second winding 31, 32 may induce voltages of the same magnitude and opposite directions.

The first plurality of voltage levels and the second plurality of voltage levels having a phase shift of 90 degrees may be combined by the coupling inductor into a third plurality of voltage levels. The number of the third plurality of voltage levels would equal to the sum of the number of the first plurality of voltage levels and the number of the second plurality of voltage levels minus one. If both the number of the first plurality of voltage levels and the second plurality of voltage levels are five, the number of the third plurality of voltage levels would be nine. If both the number of the first plurality of voltage levels and the second plurality of voltage levels are nine, the number of the third plurality of voltage levels would be seventeen.

The inductive filtering unit 4 is arranged between the AC port and the coupling inductor 3 so as to filter the third plurality of voltage levels provided by the coupling inductor 3. The coupling inductor 3 and the inductive filtering unit 4 may have various arrangements, which will be described in detail hereinafter with reference to FIGS. 3-5.

Figure 3:
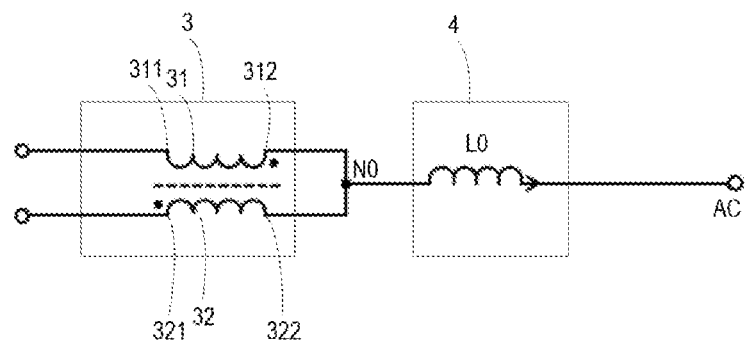
FIG. 3 illustrates an example arrangement of a coupling inductor and an inductive filtering unit in accordance with an embodiment of the present disclosure.

In an embodiment, as shown in FIG. 3, the second and fourth ends 312, 322 of the first and second windings 31, 32 are coupled to a common node NO. The inductive filtering unit 4 includes an inductor L0 arranged between the common node NO and the AC port.

Figure 4:
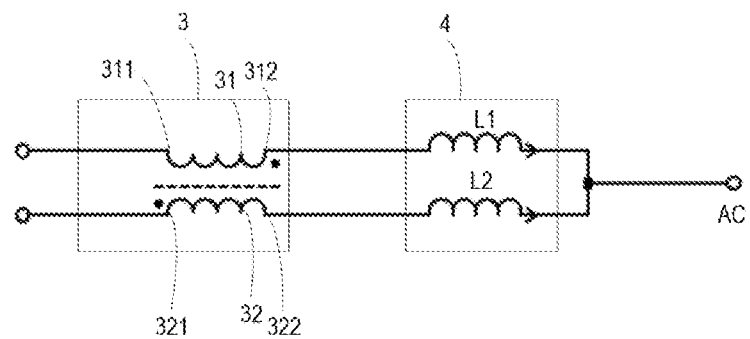
FIG. 4 illustrates an example arrangement of the coupling inductor and the inductive filtering unit in accordance with another embodiment of the present disclosure.

In another embodiment, as shown in FIG. 4, the inductive filtering unit 4 includes a first inductor L1 and a second inductor L2. The first inductor L1 is arranged between the second end 312 of the first winding 31 and the AC port. The second inductor L2 is arranged between the fourth end 322 of second winding 32 and the AC port.

Figure 5:
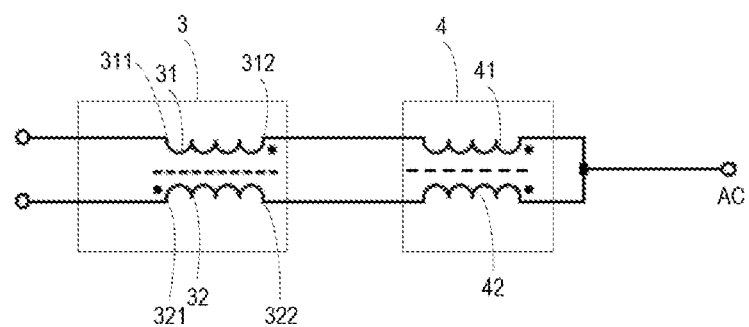
FIG. 5 illustrates an example arrangement of the coupling inductor and the inductive filtering unit in accordance with yet another embodiment of the present disclosure.

In yet another embodiment, as shown in FIG. 5, the inductive filtering unit 4 includes an additional coupling inductor consisting of third and fourth windings 41, 42. The third winding 41 is arranged between the second end 312 of the first winding 31 and the AC port. The fourth winding 42 is arranged between the fourth end 322 of second winding 32 and the AC port. Namesake ends of the third and fourth windings 41, 42 are connected to the AC port.

Figure 6:
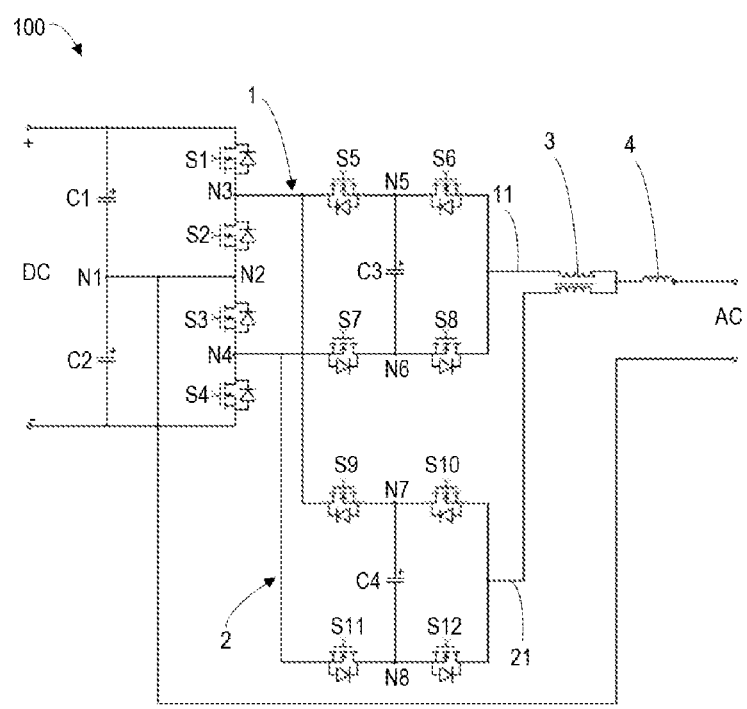
FIG. 6 illustrates a schematic circuit diagram of a multi-level power convertor in accordance with an embodiment of the present disclosure.

FIG. 6 illustrates a schematic circuit diagram of a multi-level power convertor 100 in accordance with an embodiment of the present disclosure. As shown in FIG. 6, the coupling inductor 3 and the inductive filtering unit 4 have the same construction and arrangement as those described with reference to FIGS. 2 and 3. It is to be understood the coupling inductor 3 and the inductive filtering unit 4 may have other constructions and arrangements, for example those as described above with reference to FIGS. 4 and 5. The scope of the present disclosure is not intended to be limited in this respect.

In an embodiment, as shown in FIG. 6, the first power converting unit 1 includes capacitors C1, C2, and C3 and switching semiconductor devices S1, S2, S3, S4, S5, S6, S7, and S8. The capacitors C1 and C2 are connected in series between the first and second DC terminals DC+, DC−. The switching semiconductor devices S1, S2, S3, and S4 are line frequency switches. The switching semiconductor devices S1, S2, S3, and S4 are connected in series between the first and second DC terminals DC+, DC−. A first node N1 between the capacitors C1 and C2 is connected to a second node N2 between the switching semiconductor devices S2 and S3. The node N1 may be used as a reference voltage point of the AC port. The switching semiconductor devices S5, S6, S7, and S8 are high frequency switches and have the same switching cycle. The switching semiconductor devices S5 and S6 are connected in series between a third node N3 and the first AC terminal 11. The third node N3 is between the switching semiconductor devices S1 and S2. The switching semiconductor devices S7 and S8 are connected in series between a fourth node N4 and the first AC terminal 11. The fourth node N4 is between the switching semiconductor devices S3 and S4. The third capacitor C3 is connected between a fifth node N5 and a sixth node N6. The fifth node N5 is between the switching semiconductor devices S5 and S6. The sixth node N6 is between the switching semiconductor devices S7 and S8.

The switching semiconductor devices S5 and S7 are complementary switches. That is, when the switching semiconductor device S5 is switched on, the switching semiconductor device S7 is switched off, and vice versa. Similarly, the switching semiconductor devices S6 and S8 are complementary switches. A driving signal of the switching semiconductor device S5 may lag a half of the switching cycle than that of the switching semiconductor device S6.

In an embodiment, as shown in FIG. 6, the second power converting unit 2 includes capacitors C1, C2, and C4 and switching semiconductor devices S1, S2, S3, S4, S9, S10, S11, and S12. The capacitors C1 and C2 and the switching semiconductor devices S1, S2, S3 and S4 are shared by the first power converting unit 1 and the second power converting unit 2. The switching semiconductor devices S9, S10, S11, and S12 are high frequency switches and have the same switching cycle as the switching semiconductor devices S5, S6, S7, and S8. The switching semiconductor devices S9 and S10 are connected in series between the third node N3 and the second AC terminal 21. The switching semiconductor devices S11 and S12 are connected in series between the fourth node N4 and the second AC terminal 21. The fourth capacitor C4 is connected between a seventh node N7 and an eighth node N8. The seventh node N7 is between the switching semiconductor devices S9 and S10. The eighth node N8 is between the switching semiconductor devices S11, S12.

The switching semiconductor devices S9 and S10 are complementary switches. Similarly, the switching semiconductor devices S11 and S12 are complementary switches. A driving signal of the switching semiconductor device S9 may lag a half of the switching cycle than that of the switching semiconductor device S10. Driving signals of the switching semiconductor devices S5, S6, S7, and S8 and driving signals of the switching semiconductor devices S9, S10, S11, and S12 have a phase difference of 90 degrees, i.e., a quarter of the switching cycle of these switching semiconductor devices. Thus, there is a phase shift of 90 degrees between the second plurality of voltage levels and the first plurality of voltage levels.

With the above arrangement, each of the first and second power converting units 1, 2 may provide five voltage levels at the respective AC terminals 11, 21. Accordingly, the coupling inductor 3 may provide nine voltage levels at the second end 312 of the first winding 31 and the fourth end 322 of the second winding 32. In comparison with the conventional multi-level power convertor 100 as shown in FIG. 1, the multi-level power convertor 100 as shown in FIG. 6 may provide the same number of voltage levels through using less capacitors, reducing the risk of voltage imbalance among the capacitors in the multi-level power convertor 100 and thereby avoiding the damage of the switching semiconductor devices in the multi-level power convertor 100.

Figure 7:
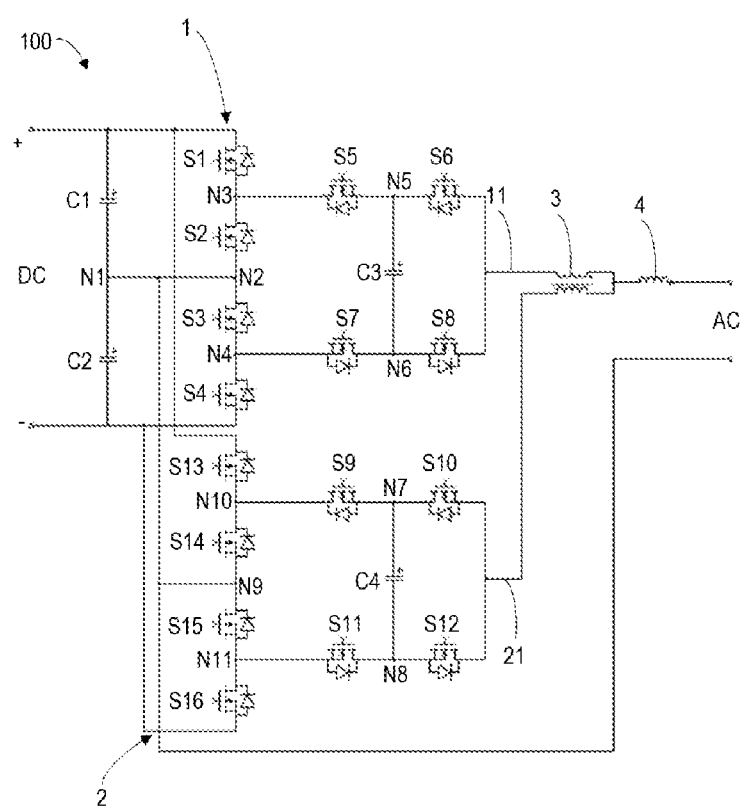
FIG. 7 illustrates a schematic circuit diagram of a multi-level power convertor in accordance with another embodiment of the present disclosure.

FIG. 7 illustrates a schematic circuit diagram of a multi-level power convertor 100 in accordance with another embodiment of the present disclosure. The construction of the multi-level power convertor 100 as shown in FIG. 7 is similar to that of the multi-level power convertor 100 as shown in FIG. 6. The difference between the multi-level power convertors 100 as shown in FIGS. 6 and 7 lies in the construction of the second power converting units 2.

As shown in FIG. 7, the second power converting unit 2 includes capacitors C1, C2, and C4 and switching semiconductor devices S13, S14, S15, S16, S9, S10, S11, and S12. The switching semiconductor devices S13, S14, S15, and S16 are line frequency switches. The switching semiconductor devices S9, S10, S11, and S12 are high frequency switches. The capacitors C1 and C2 are shared by the first power converting unit 1 and the second power converting unit 2. The switching semiconductor devices S13, S14, S15, and S16 are connected in series between the first and second DC terminals DC+, DC−. A ninth node N9 between the switching semiconductor devices S14 and S15 is connected to the first node N1. The switching semiconductor devices S9 and S10 are connected in series between a tenth node N10 and the second AC terminal 21. The tenth node N10 is between the switching semiconductor devices S13 and S14. The switching semiconductor devices S11 and S12 are connected in series between an eleventh node N11 and the second AC terminal 21. The eleventh node N11 is between the switching semiconductor devices S15 and S16. The fourth capacitor C4 is connected between a seventh node N7 and an eighth node N8. The seventh node N7 is between the switching semiconductor devices S9 and S10. The eighth node N8 is between the switching semiconductor devices S11 and S12.

With the above arrangements, the operation of the multi-level power convertor 100 as shown in FIG. 7 is similar to that of the multi-level power convertor 100 as shown in FIG. 6.

Figure 8:
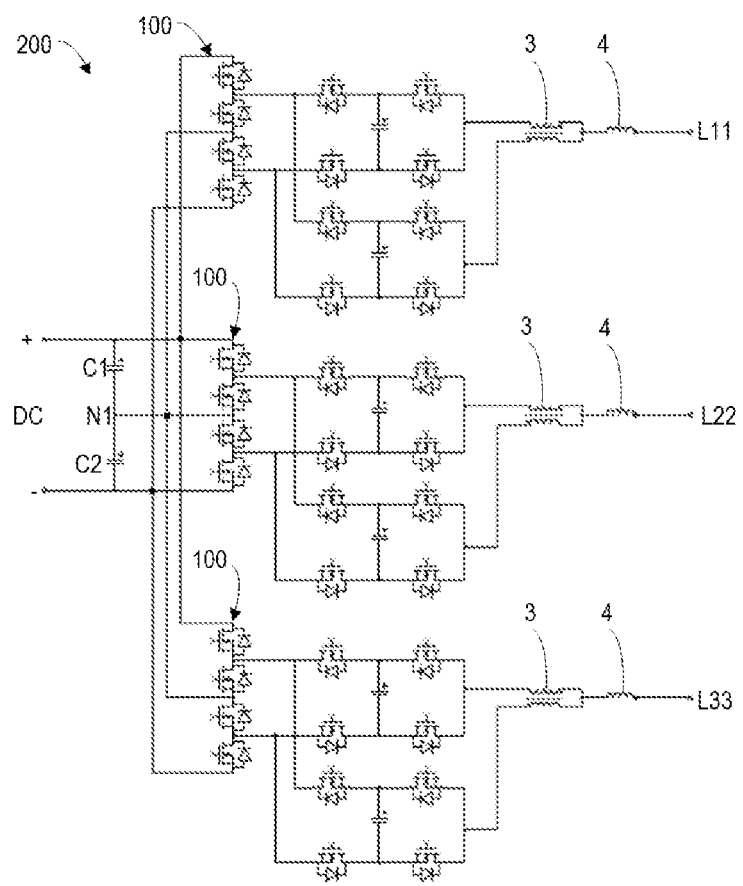
FIG. 8 illustrates a schematic circuit diagram of a three-phase power converting circuit in accordance with an embodiment of the present disclosure.

Each of the multi-level power convertors 100 as described with reference to FIGS. 2-7 is a single-phase circuit. However, in other embodiments, each of the multi-level power convertors 100 may be used to form a three-phase circuit. FIG. 8 illustrates a schematic circuit diagram of a three-phase power converting circuit 200 in accordance with an embodiment of the present disclosure. As shown in FIG. 8, the three-phase power converting circuit 200 includes three phases L11, L22, and L33. Each of the phases L11, L22, and L33 includes the multi-level power convertor 100 as described above with reference to FIG. 6. In other embodiments, each of the phases L11, L22, and L33 may include the multi-level power convertor 100 according to other embodiments.

Figure 9:
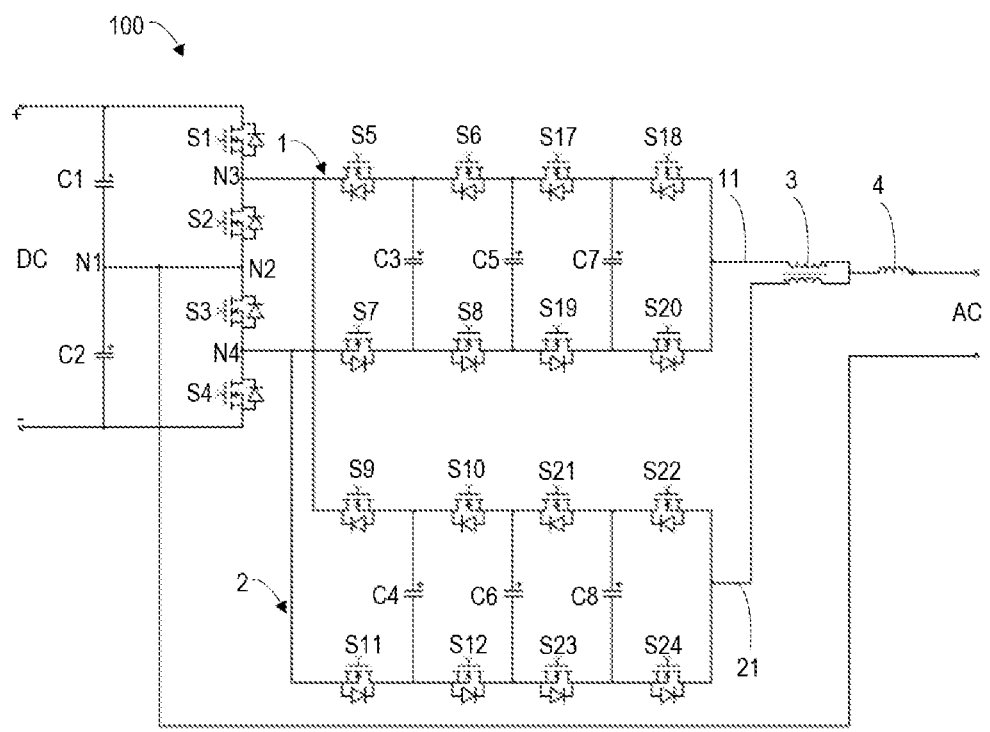
FIG. 9 illustrates a schematic circuit diagram of a multi-level power convertor in accordance with another embodiment of the present disclosure.

FIG. 9 illustrates a schematic circuit diagram of a multi-level power convertor 100 in accordance with another embodiment of the present disclosure. The construction of the multi-level power convertor 100 as shown in FIG. 9 is similar to that of the multi-level power convertor 100 as shown in FIG. 6. The difference between the multi-level power convertors 100 as shown in FIGS. 9 and 6 lies in the construction of the first and second power converting units 1, 2. As shown in FIG. 9, the first power converting unit 1 further includes switching semiconductor devices S17, S18, S19, and S20 and capacitors C5 and C7. Similarly, the second power converting unit 2 further includes switching semiconductor devices S21, S22, S23, and S24 and capacitors C6 and C8. With such an arrangement, each of the first and second power converting units 1, 2 may provide nine voltage levels at the respective AC terminals 11 and 12. Then, the coupling inductor 3 may output seventeen voltage levels.

Figure 10:
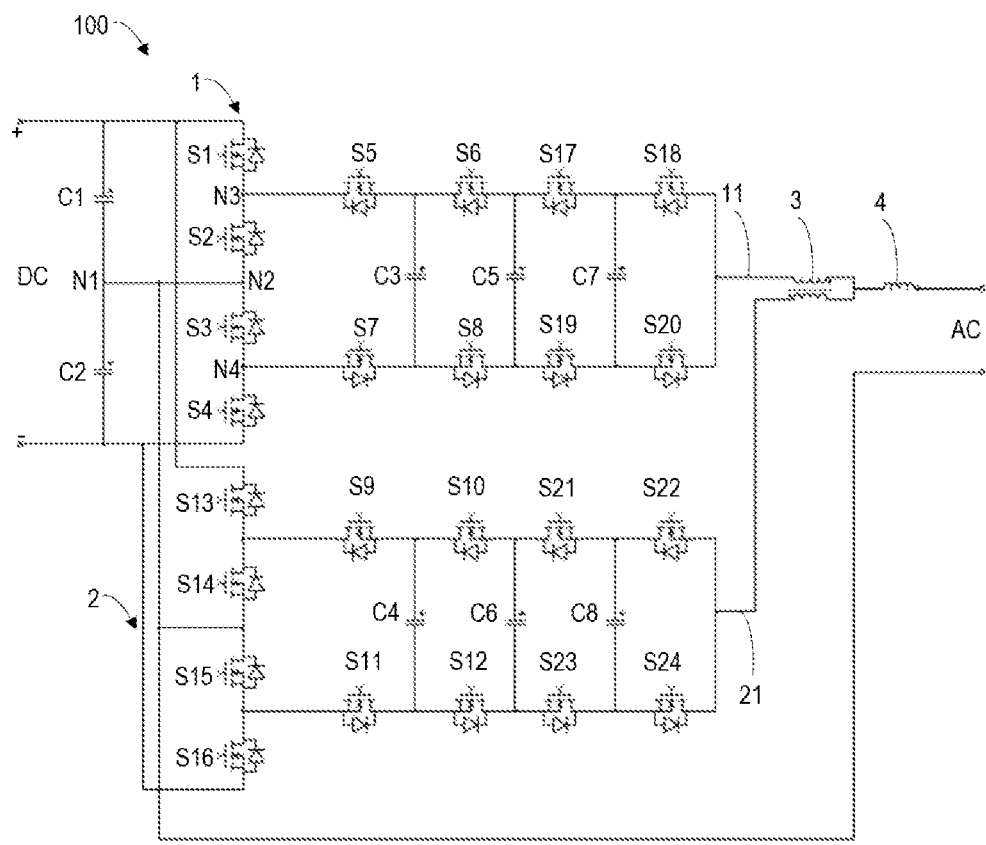
FIG. 10 illustrates a schematic circuit diagram of a multi-level power convertor in accordance with yet another embodiment of the present disclosure.

FIG. 10 illustrates a schematic circuit diagram of a multi-level power convertor 100 in accordance with yet another embodiment of the present disclosure. The construction of the multi-level power convertor 100 as shown in FIG. 10 is similar to that of the multi-level power convertor 100 as shown in FIG. 7. The difference between the multi-level power convertors 100 as shown in FIGS. 10 and 7 lies in the constructions of the first and second power converting units 1, 2. As shown in FIG. 10, the first power converting unit 1 further includes switching semiconductor devices S17, S18, S19, and S20 and capacitors C5 and C7. Similarly, the second power converting unit 2 further includes switching semiconductor devices S21, S22, S23, and S24 and capacitors C6 and C8. With such an arrangement, each of the first and second power converting units 1, 2 may provide nine voltage levels at the respective AC terminals 11 and 12. Then, the coupling inductor 3 may output seventeen voltage levels.

In embodiments according to the present disclosure, the switching semiconductor devices in the first and second power converting units 1, 2 may be of various types, for example MOSFET, IGBT and the like. The scope of the present disclosure is not intended to be limited in this respect.

In some embodiments, a method for the multi-level power convertor 100 as described above is provided. The method includes providing a first plurality of voltage levels to the first end 311 of the first winding 31 from the first AC terminal 11; providing a second plurality of voltage levels of the same number as the first plurality of voltage levels to the third end 321 of the second winding 32 from the second AC terminal 21, wherein the second plurality of voltage levels are phase-shifted by 90 degrees with respect to the first plurality of voltage levels; and outputting a third plurality of voltage levels via the second end 312 of the first winding 31 and the fourth end 322 of the second winding 32, wherein the number of the third plurality of voltage levels equals to the sum of the number of the first plurality of voltage levels and the number of the second plurality of voltage levels minus one.

According to various embodiments of the present disclosure, the first plurality of voltage levels and the second plurality of voltage levels having a phase shift of 90 degrees may be combined by the coupling inductor 3 into a third plurality of voltage levels; the number of the third plurality of voltage levels equals to the sum of the number of the first plurality of voltage levels and the number of the second plurality of voltage levels minus one. In this way, the multi-level power convertor 100 in accordance with embodiments of the present disclosure may generate the same number of voltage levels as the conventional multi-level power convertor through using less capacitors, reducing the risk of voltage imbalance among the capacitors in the multi-level power convertor 100 and thereby avoiding the damage of the switching semiconductor devices in the multi-level power convertor 100. Hence, the performance and reliability of the multi-level power convertor 100 may be improved.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A multi-level power convertor comprising:
   a DC port;
   an AC port;
   a first power converting unit coupled to the DC port and comprising a first AC terminal adapted to provide a first plurality of voltage levels;
   a second power converting unit coupled to the DC port and comprising a second AC terminal adapted to provide a second plurality of voltage levels of a same number as the first plurality of voltage levels, wherein the second plurality of voltage levels are phase-shifted by 90 degrees with respect to the first plurality of voltage levels;
   a coupling inductor comprising first and second windings with a same number of turns, wherein the first winding comprises a first end coupled to the first AC terminal and a second end, the second winding comprises a third end coupled to the second AC terminal and a fourth end, and the second end of the first winding and the third end of the second winding are namesake ends of the first and second windings; and an inductive filtering unit arranged between the AC port and the second and fourth ends of the first and second windings,
wherein each of the first and second AC terminals provides n voltage levels, and the AC port provides 2n-1 voltage levels.

2. The multi-level power convertor according to claim 1, wherein the second and fourth ends of the first and second windings are coupled to a common node, and wherein the inductive filtering unit comprises an inductor arranged between the common node and the AC port.

3. The multi-level power convertor according to claim 1, wherein the inductive filtering unit comprises:
a first inductor arranged between the second end of the first winding and the AC port; and
a second inductor arranged between the fourth end of the second winding and the AC port.

4. The multi-level power convertor according to claim 1, wherein the inductive filtering unit comprises an additional coupling inductor comprising third and fourth windings,
wherein the third winding is arranged between the second end of the first winding and the AC port,
wherein the fourth winding is arranged between the fourth end of the second winding and the AC port, and
wherein namesake ends of the third and fourth windings are connected to the AC port.

5. The multi-level power convertor according to claim 1, wherein n=5.

6. The multi-level power convertor according to claim 1, wherein the DC port comprises first and second DC terminals, and wherein the first power converting unit comprises:
first and second capacitors connected in series between the first and second DC terminals;
first, second, third, and fourth switching semiconductor devices connected in series between the first and second DC terminals, wherein a first node between the first and second capacitors is connected to a second node between the second and third switching semiconductor devices;
fifth and sixth switching semiconductor devices connected in series between a third node and the first AC terminal, the third node being between the first and second switching semiconductor devices;
seventh and eighth switching semiconductor devices connected in series between a fourth node and the first AC terminal, the fourth node being between the third and fourth switching semiconductor devices; and
a third capacitor connected between a fifth node and a sixth node, the fifth node being between the fifth and sixth switching semiconductor devices, and the sixth node being between the seventh and eighth switching semiconductor devices.

7. The multi-level power convertor according to claim 6, wherein the second power converting unit comprises:
the first and second capacitors shared with the first power converting unit;
the first, second, third, and fourth switching semiconductor devices shared with the first power converting unit;
ninth and tenth switching semiconductor devices connected in series between the third node and the second AC terminal;
eleventh and twelfth switching semiconductor devices connected in series between the fourth node and the second AC terminal; and
a fourth capacitor connected between a seventh node and an eighth node, the seventh node being between the ninth and tenth switching semiconductor devices, and the eighth node being between the eleventh and twelfth switching semiconductor devices.

8. The multi-level power convertor according to claim 6, wherein the second power converting unit comprises:
the first and second capacitors shared with the first power converting unit;
thirteenth, fourteenth, fifteenth, and sixteenth switching semiconductor devices connected in series between the first and second DC terminals, wherein a ninth node between the fourteenth and fifteenth switching semiconductor devices is connected to the first node;
ninth and tenth switching semiconductor devices connected in series between the a tenth node and the second AC terminal, the tenth node being between the thirteenth and fourteenth switching semiconductor devices;
eleventh and twelfth switching semiconductor devices connected in series between an eleventh node and the second AC terminal, the eleventh node being between the fifteenth and sixteenth switching semiconductor devices; and
a fourth capacitor connected between a seventh node and an eighth node, the seventh node being between the ninth and tenth switching semiconductor devices, and the eighth node being between the eleventh and twelfth switching semiconductor devices.

9. The multi-level power convertor according to claim 1, wherein n=9.

10. The multi-level power convertor according to claim 1, wherein the multi-level power convertor operates as an inverter when the DC port is used as an input and the AC port is used as an output, and
wherein the multi-level power convertor operates as a rectifier when the AC port is used as an input and the DC port is used as an output.

11. A method for a multi-level power convertor, the multi-level power convertor comprising a DC port; an AC port; a first power converting unit coupled to the DC port and comprising a first AC terminal; a second power converting unit coupled to the DC port and comprising a second AC terminal; a coupling inductor comprising first and second windings with a same number of turns, wherein the first winding comprises a first end coupled to the first AC terminal and a second end, the second winding comprises a third end coupled to the second AC terminal and a fourth end, and the second end of the first winding and the third end of the second winding are namesake ends of the first and second windings; and an inductive filtering unit arranged between the AC port and the second and fourth ends of the first and second windings,
the method comprising:
providing a first plurality of voltage levels to the first end of the first winding from the first AC terminal;
providing a second plurality of voltage levels of a same number as the first plurality of voltage levels to the third end of the second winding from the second AC terminal, wherein the second plurality of voltage levels are phase-shifted by 90 degrees with respect to the first plurality of voltage levels; and
outputting a third plurality of voltage levels via the second end of the first winding and the fourth end of the second winding, wherein a number of the third plurality of voltage levels equals to a sum of a number of the first plurality of voltage levels and a number of the second plurality of voltage levels minus one.

12. The method according to claim 11, wherein the second and fourth ends of the first and second windings are coupled to a common node, and wherein the inductive filtering unit comprises an inductor arranged between the common node and the AC port.

13. The method according to claim 11, wherein the inductive filtering unit comprises:
- a first inductor arranged between the second end of the first winding and the AC port; and
- a second inductor arranged between the fourth end of the second winding and the AC port.

14. The method according to claim 11, wherein the inductive filtering unit comprises an additional coupling inductor comprising third and fourth windings,
- wherein the third winding is arranged between the second end of the first winding and the AC port,
- wherein the fourth winding is arranged between the fourth end of the second winding and the AC port, and
- wherein namesake ends of the third and fourth windings are connected to the AC port.

15. A multi-level power convertor comprising:
- a DC port;
- an AC port;
- a first power converting unit coupled to the DC port and comprising a first AC terminal adapted to provide a first plurality of voltage levels;
- a second power converting unit coupled to the DC port and comprising a second AC terminal adapted to provide a second plurality of voltage levels of a same number as the first plurality of voltage levels, wherein the second plurality of voltage levels are phase-shifted by 90 degrees with respect to the first plurality of voltage levels;
- a coupling inductor comprising first and second windings with a same number of turns, wherein the first winding comprises a first end coupled to the first AC terminal and a second end, the second winding comprises a third end coupled to the second AC terminal and a fourth end, and the second end of the first winding and the third end of the second winding are namesake ends of the first and second windings; and
- an inductive filtering unit comprising an additional coupling inductor having third and fourth windings, wherein the third winding is arranged between the second end of the first winding and the AC port, wherein the fourth winding is arranged between the fourth end of the second winding and the AC port, and wherein namesake ends of the third and fourth windings are connected to the AC port.

16. The multi-level power convertor according to claim 15, wherein the DC port comprises first and second DC terminals, and wherein the first power converting unit comprises:
- first and second capacitors connected in series between the first and second DC terminals;
- first, second, third, and fourth switching semiconductor devices connected in series between the first and second DC terminals, wherein a first node between the first and second capacitors is connected to a second node between the second and third switching semiconductor devices;
- fifth and sixth switching semiconductor devices connected in series between a third node and the first AC terminal, the third node being between the first and second switching semiconductor devices;
- seventh and eighth switching semiconductor devices connected in series between a fourth node and the first AC terminal, the fourth node being between the third and fourth switching semiconductor devices; and
- a third capacitor connected between a fifth node and a sixth node, the fifth node being between the fifth and sixth switching semiconductor devices, and the sixth node being between the seventh and eighth switching semiconductor devices.

17. The multi-level power convertor according to claim 16, wherein the second power converting unit comprises:
- the first and second capacitors shared with the first power converting unit;
- the first, second, third, and fourth switching semiconductor devices shared with the first power converting unit;
- ninth and tenth switching semiconductor devices connected in series between the third node and the second AC terminal;
- eleventh and twelfth switching semiconductor devices connected in series between the fourth node and the second AC terminal; and
- a fourth capacitor connected between a seventh node and an eighth node, the seventh node being between the ninth and tenth switching semiconductor devices, and the eighth node being between the eleventh and twelfth switching semiconductor devices.

18. The multi-level power convertor according to claim 16, wherein the second power converting unit comprises:
- the first and second capacitors shared with the first power converting unit;
- thirteenth, fourteenth, fifteenth, and sixteenth switching semiconductor devices connected in series between the first and second DC terminals, wherein a ninth node between the fourteenth and fifteenth switching semiconductor devices is connected to the first node;
- ninth and tenth switching semiconductor devices connected in series between the a tenth node and the second AC terminal, the tenth node being between the thirteenth and fourteenth switching semiconductor devices;
- eleventh and twelfth switching semiconductor devices connected in series between an eleventh node and the second AC terminal, the eleventh node being between the fifteenth and sixteenth switching semiconductor devices; and
- a fourth capacitor connected between a seventh node and an eighth node, the seventh node being between the ninth and tenth switching semiconductor devices, and the eighth node being between the eleventh and twelfth switching semiconductor devices.

19. The multi-level power convertor according to claim 15, wherein each of the first and second AC terminals provides n voltage levels, and the AC port provides 2n-1 voltage levels.

20. The multi-level power convertor according to claim 19, wherein n=5 or n=9.

* * * * *